(12) United States Patent
Acar et al.

(10) Patent No.: US 7,421,898 B2
(45) Date of Patent: Sep. 9, 2008

(54) TORSIONAL NONRESONANT Z-AXIS MICROMACHINED GYROSCOPE WITH NON-RESONANT ACTUATION TO MEASURE THE ANGULAR ROTATION OF AN OBJECT

(75) Inventors: Cenk Acar, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 62 days.

(21) Appl. No.: 11/203,254

(22) Filed: Aug. 12, 2005

(65) Prior Publication Data
US 2006/0032308 A1 Feb. 16, 2006

Related U.S. Application Data

(60) Provisional application No. 60/602,237, filed on Aug. 16, 2004.

(51) Int. Cl.
*G01P 9/04* (2006.01)
(52) U.S. Cl. .................. 73/504.12; 73/504.14
(58) Field of Classification Search .............. 73/504.12, 73/504.14
See application file for complete search history.

(56) References Cited

U.S. PATENT DOCUMENTS

| 5,515,724 A | * | 5/1996 | Greiff et al. | ............... 73/504.12 |
| 6,845,669 B2 | * | 1/2005 | Acar et al. | ............... 73/504.14 |

FOREIGN PATENT DOCUMENTS

WO WO 02/088631 * 11/2002

* cited by examiner

*Primary Examiner*—John E Chapman
(74) *Attorney, Agent, or Firm*—Daniel L. Dawes

(57) ABSTRACT

A gimbal-type torsional z-axis micromachined gyroscope with a non-resonant actuation scheme measures angular rate of an object with respect to the axis normal to the substrate plane (the z-axis). A 2 degrees-of-freedom (2-DOF) drive-mode oscillator is comprised of a sensing plate suspended inside two gimbals. By utilizing dynamic amplification of torsional oscillations in the drive-mode instead of resonance, large oscillation amplitudes of the sensing element is achieved with small actuation amplitudes, providing improved linearity and stability despite parallel-plate actuation. The device operates at resonance in the sense direction for improved sensitivity, while the drive direction amplitude is inherently constant within the same frequency band.

6 Claims, 7 Drawing Sheets

TORSIONAL NONRESONANT Z-AXIS MICROMACHINED GYROSCOPE WITH NON-RESONANT ACTUATION TO MEASURE THE ANGULAR ROTATION OF AN OBJECT

RELATED APPLICATIONS

The present application is related to U.S. Provisional Patent Application, Ser. No. 60/602,237, filed on Aug. 16, 2004, which is incorporated herein by reference and to which priority is claimed pursuant to 35 USC 119.

BACKGROUND OF THE INVENTION

1. Field of the Invention

The invention relates to the field of inertial micromachined transducers for measurement of angular rotation rate of an object.

2. Description of the Prior Art

Micromachined gyroscopes have a wide application range, including high performance navigation and guidance systems, automotive safety systems like yaw and tilt control, roll-over protection and next generation airbag and antilock brake systems, and also consumer electronics applications like image stabilization in video cameras, virtual reality products, and pointing devices. Also, orders of magnitude reduction in production cost is achieved by surface micromachining.

Many emerging angular-rate measurement applications dictate orders of magnitude reduction in size, weight, cost, and power consumption of existing high-end gyroscope technologies, including spinning wheel, laser-ring and fiber-optic devices. Thus, miniaturization of vibratory gyroscopes with micromachining technologies is expected to become an attractive solution to current inertial sensing market needs, as well as open new market opportunities with an even wider application range. Innovative micro-fabrication processes and gyroscope designs suggest drastic improvement in performance and functionality of micromachined gyroscopes in the near future. Due to their robustness against shock and vibration, potentially increased reliability, and their compatibility to mass-production; solid-state sensors are projected to become a crucial part of automotive industry, military equipment and consumer electronics.

Batch-fabrication of micro machined gyroscopes in VLSI compatible surface-micromachining technologies constitutes the key factor in low-cost production and commercialization. The first integrated commercial MEMS gyroscopes produced by Analog Devices have been fabricated utilizing surface micromachining technology. However, the limited thickness of structural layers attained in current surface-micromachining processes results in very small sensing capacitances and higher actuation voltages, restricting the performance of the gyroscope. Various devices have been proposed in the literature that employ out-of-plane actuation and detection, with large capacitive electrode plates. However, highly nonlinear and unstable nature of parallel-plate actuation limits the actuation amplitude of the gyroscope.

The conventional micromachined rate gyroscopes operate on the vibratory principle of a two-degrees-of-freedom (2-DOF) system with a single proof-mass suspended by suspension beams anchored to the substrate. The proof-mass is sustained in resonance in the drive direction, and in the presence of an angular rotation, the Coriolis force proportional to the input angular rate is induced in the orthogonal direction (sense direction). To achieve high sensitivity, the drive and the sense resonant frequencies are typically designed and tuned to match, and the device is controlled to operate at or near the peak of the response curve. To enhance the sensitivity further, the device is packaged in high vacuum, minimizing energy dissipation due to viscous effects of air surrounding the mechanical structure. Extensive research has been focused on design of symmetric suspensions and resonator systems for mode-matching and minimizing temperature dependence. However, especially for lightly-damped devices, the requirement for mode-matching is well beyond fabrication tolerances; and none of the symmetric designs can provide the required degree of mode-matching without feedback control.

Clark, Micromachined z-Axis Vibratory Gyroscope, U.S. Pat. No. 5,992,233 (1999) shows a gyro with a single mass, driven in-plane (x-axis), and sensed in-plane (y-axis) in order to respond to z-axis angular rate. Thus, surface-micromachined implementations use very thin actuation and detection electrode fingers, resulting in very small sense capacitances, and requiring very large actuation voltages. Also, the device is 1-DOF (degree of freedom) resonant in the drive-mode, and is 1-DOF resonant in the sense-mode. Both the drive and the sense bandwidths are extremely narrow, requiring extremely precise mode-matching. The device that we disclose provides a flat operation region in the drive-mode, and is inherently robust against parameter fluctuations. Also, very large actuation and detection areas are possible with the torsional scheme, providing very large detection capacitance, and low actuation voltages.

To achieve the maximum possible gain, the existing gyroscopes are designed to operate in the peak area of the response curve by matching drive and sense resonant frequencies. Single mass gyroscopes are very sensitive to variations in system parameters that effect resonant frequencies. The bandwidth is extremely narrow, especially for low damping conditions, and the gain is affected drastically by damping changes. Generally, very sophisticated control electronics is used to provide operation in the region of the resonance peak. Also, surface-micromachined implementations of in-plane vibrating devices use very thin actuation and detection electrode fingers, resulting in very small sense capacitances, and requiring very large actuation voltages.

The limited thickness of structural layers attained in current surface-micromachining processes results in very small sensing capacitances and higher actuation voltages, restricting the performance of the surface-micro machined gyroscopes.

What is needed is some type of design and method of operation which avoids these defects of the prior art.

BRIEF SUMMARY OF THE INVENTION

The illustrated embodiment is a surface-micromachined torsional gyroscope design utilizing dynamical amplification of rotational oscillations to achieve large oscillation amplitudes about the drive axis without resonance; thus addressing the issues of electrostatic instability while providing large sense capacitance. The approach employs a three-mass structure with two gimbals and a sensing plate. Large oscillation amplitudes in the passive gimbal, which contains the sensing plate, are achieved by amplifying the small oscillation amplitude of the driven gimbal (active gimbal). Thus, the actuation range of the parallel-plate actuators attached to the active gimbal is narrow, minimizing the nonlinear force profile and instability. The proposed non-resonant micromachined gyroscope design concept also addresses one of the major MEMS gyroscope design challenges, which is the mode-matching requirement.

The illustrated embodiment of the invention provides large detection capacitance which leads to improved performance and low actuation voltages, which leads to reduced drive-signal interference and lower noise; and improved robustness against parameter fluctuations. The illustrated embodiment eliminates the mode-matching requirement by utilizing dynamic amplification of rotational oscillations instead of resonance in the drive direction. Thus, the design overcomes the small actuation and sensing capacitance limitation of surface-micromachined gyroscopes, while achieving improved excitation stability and robustness against fabrication imperfections and fluctuations in operation conditions.

Restated in other terms, the gimbal-type torsional z-axis micromachined gyroscope with a non-resonant actuation scheme measures angular rate of an object with respect to the axis normal to the substrate plane (the z-axis). The design concept is based on employing a 2 degrees-of-freedom (2-DOF) drive-mode oscillator comprised of a sensing plate suspended inside two gimbals. By utilizing dynamic amplification of torsional oscillations in the drive-mode instead of resonance, large oscillation amplitudes of the sensing element is achieved with small actuation amplitudes, providing improved linearity and stability despite parallel-plate actuation. The device operates at resonance in the sense direction for improved sensitivity, while the drive direction amplitude is inherently constant within the same frequency band. Thus, the necessity to match drive and sense resonance modes is eliminated, leading to improved robustness against structural and thermal parameter fluctuations. The preliminary experimental results demonstrate the basic operational principles and verify the feasibility of the design concept.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
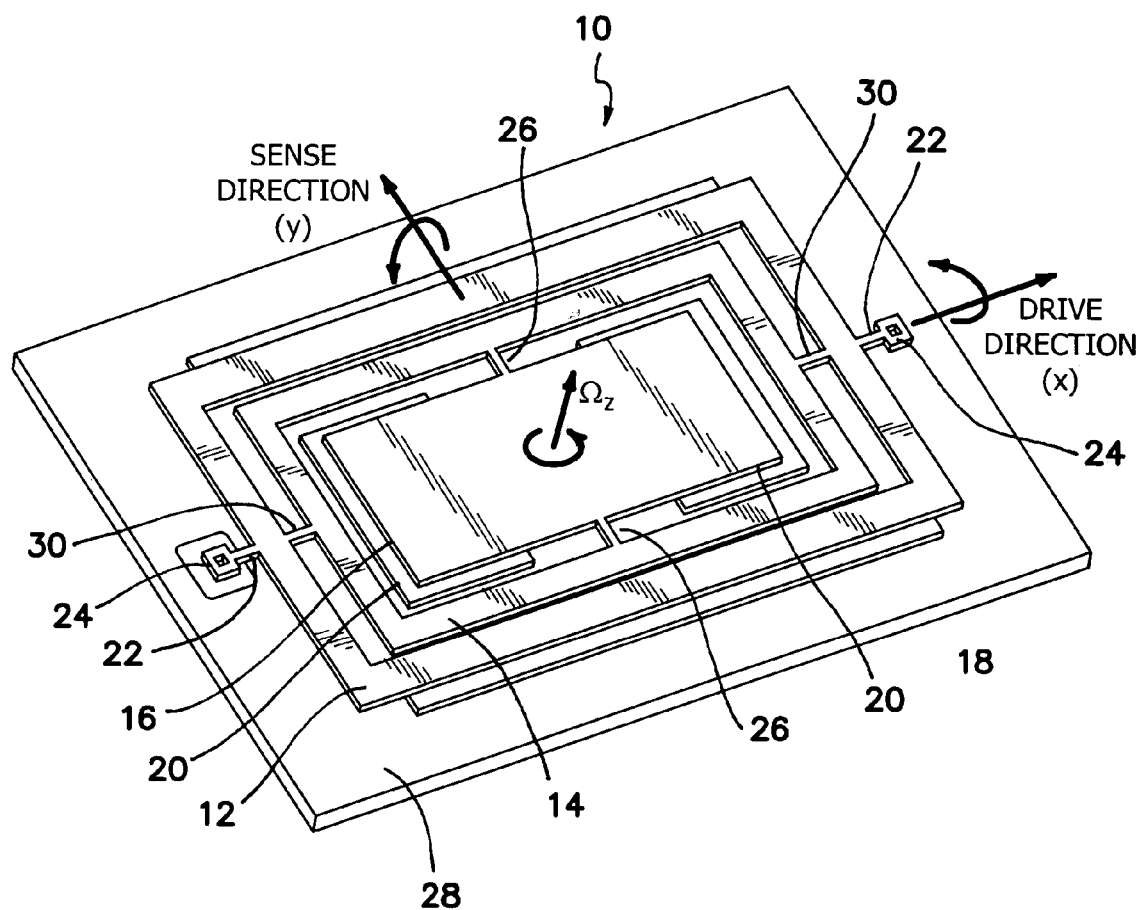
FIG. 1 is a schematic of the torsional micromachined gyroscope with non-resonant drive of the illustrated embodiment of the invention.

The illustrated embodiment of torsional gyroscope system, generally denoted by reference numeral 10, is comprised of three interconnected rotary masses: the active gimbal 12, the passive gimbal 14, and the sensing plate 16 as depicted in FIG. 1. The active gimbal 12 and the passive gimbal 14 are free to oscillate only about the drive axis x. The sensing plate 16 oscillates together with the passive gimbal 14 about the drive axis, x, but is free to oscillate independently about the sense axis y, which is the axis of response when a rotation along z-axis is applied. Active gimbal 12 is coupled to substrate 28 though opposing anchors 24 lying along the x direction and held above substrate 28 by a pair of opposing suspension beams 22. Similarly, a pair of suspension beams 30 lying along the x direction connect active gimbal 12 to passive gimbal 14. Passive gimbal 14 is connected to sensing gimbal 16 by a pair of opposing suspension beams 26 lying along the y direction.

Figure 3A:
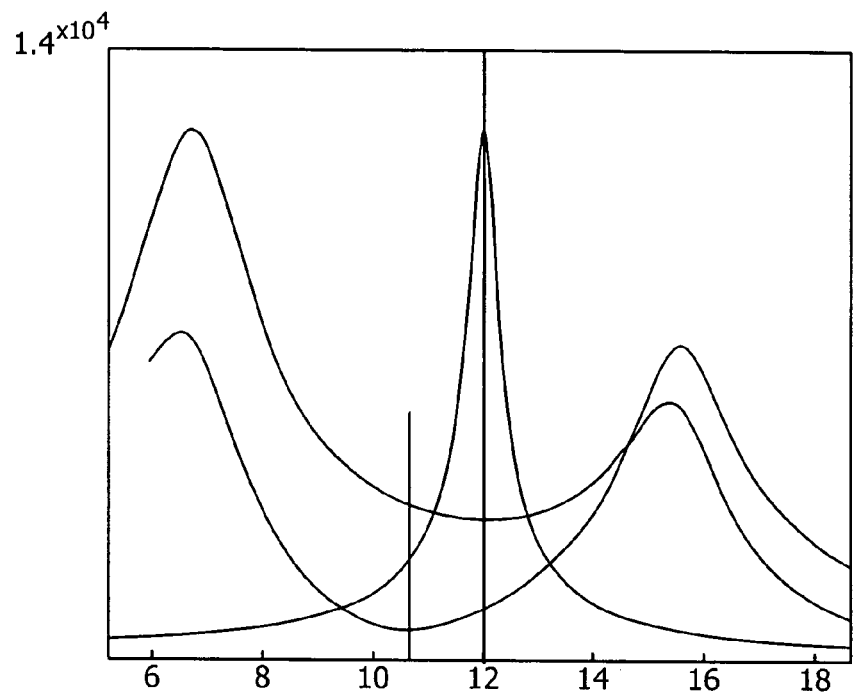
FIG. 3(a) is a graph of the angular deflection amplitude in degrees as a function of driving frequency of the 2-DOF drive and 1-DOF sense-mode oscillators.

The active gimbal 12 is driven about the x-axis by parallel-plate actuators 18 formed by the electrode plates underneath active gimbal 12. The combination of the passive gimbal 14 and the sensing plate 16 comprises the vibration absorber of the driven active gimbal 12. Thus, a torsional 2-DOF oscillator is formed in the drive direction, x. The frequency response of the 2-DOF drive oscillator has two resonant peaks and a flat region between the peaks, where the response amplitude is less sensitive to parameter variations as shown in the graph of FIG. 3a. The sensing plate 16, which is the only mass free to oscillate about the sense axis, y, forms the 1-DOF torsional resonator in the sense direction, y.

In the presence of an input angular rate about the sensitive axis normal to the substrate (namely the z-axis), only the sensing plate 16 responds to the rotation-induced Coriolis torque. The oscillations of the sense plate 16 about the sense axis z are detected by the electrodes 20 placed underneath the sense plate 16. Since the dynamical system is a 1-DOF resonator in the sense direction y, the frequency response of the device 10 has a single resonance peak in the sense mode. To define the operation frequency band of the system, sense direction resonance frequency of the sensing plate 16 is designed to coincide with the flat region of the drive oscillator as graphically depicted in FIG. 3a. This allows operation at resonance in the sense direction for improved sensitivity, while the drive direction amplitude is inherently constant in the same frequency band, in spite of parameter variations or perturbations.

Thus, the illustrated embodiment eliminates the mode-matching requirement by utilizing dynamic amplification of rotational oscillations instead of resonance in drive direction x, leading to reduced sensitivity to structural and thermal parameter fluctuations and damping variations, while attaining sufficient performance with resonance in the sense-mode.

Figure 2:
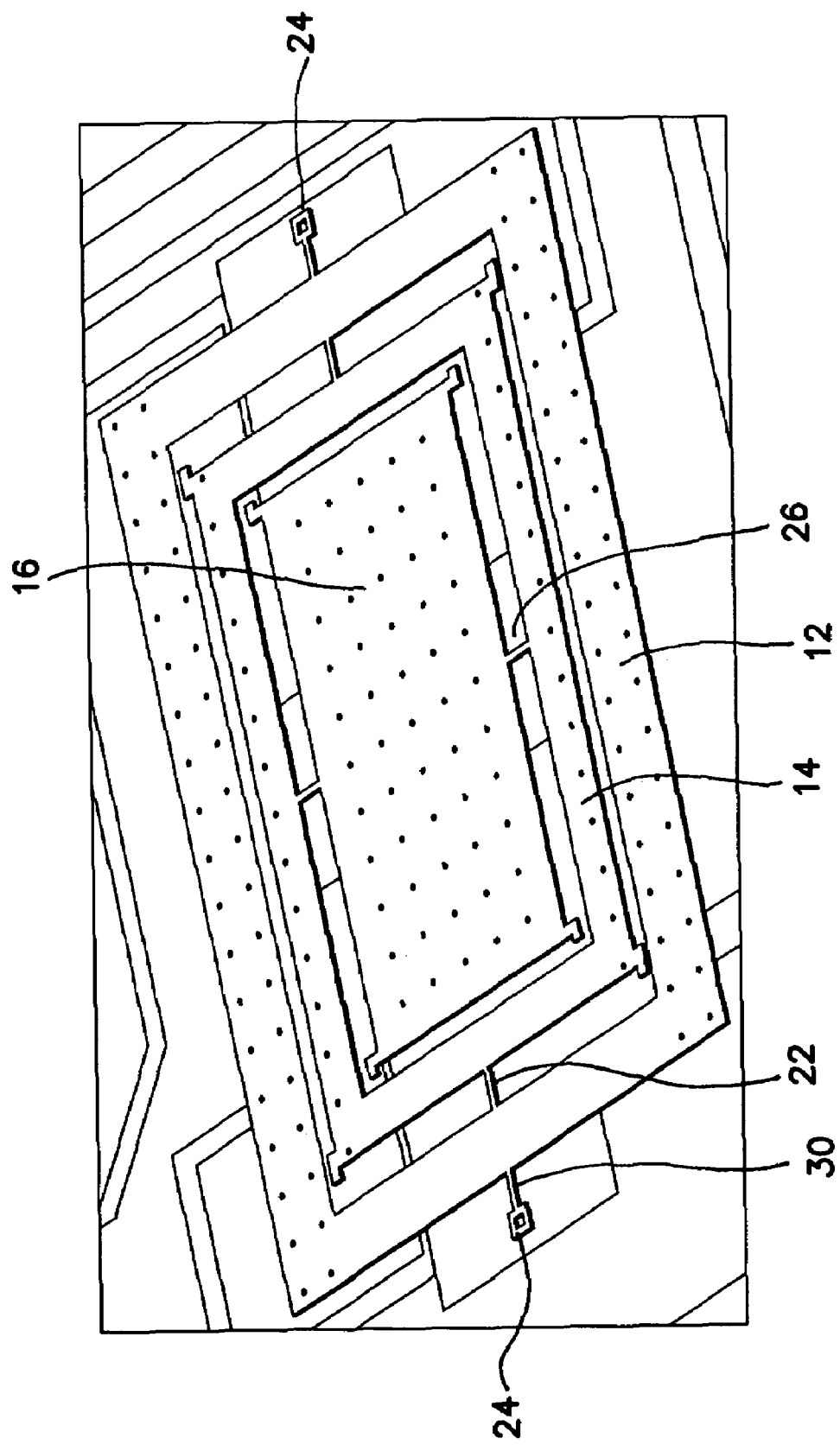
FIG. 2 is a scanning electron microscope (SEM) micrograph of fabricated example of the torsional micromachined gyroscope of the invention.

An example of the torsional gyroscope has been fabricated using a standard surface-micromachining, which example is shown in the photograph of FIG. 2. The design objectives have been verified experimentally as discussed below. The basic operational principles of the design concept have also been experimentally demonstrated with linear prototype gyroscopes, including the flat driving frequency band within where the drive-mode amplitude varies insignificantly, and mechanical amplification of active mass oscillation by the sensing element.

Figure 3B:
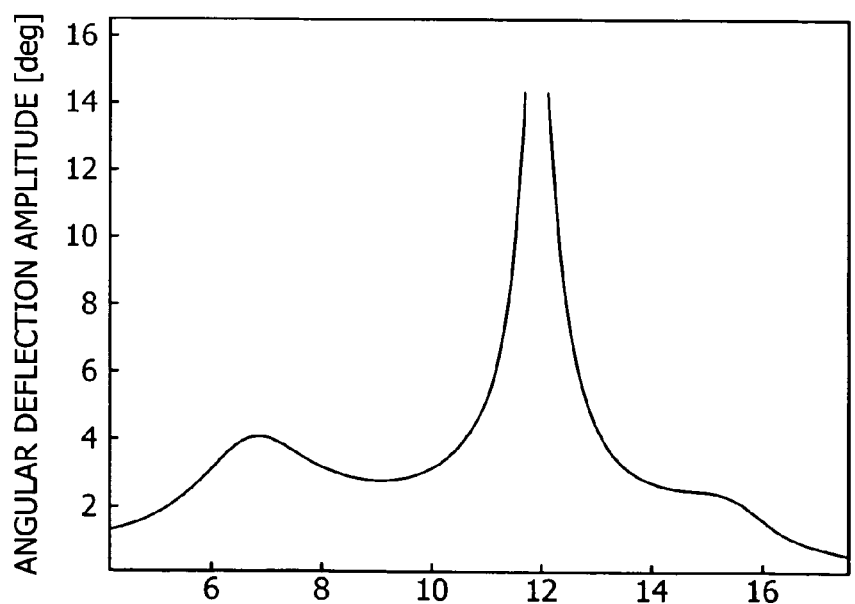
FIG. 3(b) is a graph of the angular deflection amplitude in degrees as a function of driving frequency of the overall 3-DOF gyroscope system. The drive-direction oscillation amplitude is insensitive to parameter variations and damping fluctuations in the flat operating region, eliminating mode-matching requirement.

Consider first the Coriolis response of system 10. The design concept operates at the sense-direction resonance frequency of the 1-DOF sensing plate 16, in order to attain the maximum possible oscillation amplitudes in response to the induced Coriolis torque. The frequency response of the 2-DOF drive direction oscillator has two resonant peaks and a flat region between the peaks as shown in FIG. 3a. When the active gimbal 12 is excited in the flat frequency band, amplitudes of the drive-direction oscillations are insensitive to parameter variations due to any possible fluctuation in operation conditions of the system 10. Moreover, the maximum dynamic amplification of active gimbal 12 oscillations by the passive gimbal 14 occurs in this flat operation region, at the antiresonance frequency. Thus, in order to operate the sense-direction resonator at resonance, while the 2-DOF drive direction oscillators operates in the flat-region frequency bands, the flat region of the drive-oscillator has to be designed to overlap with the sense-direction resonance peak as shown in FIG. 3a. This can be achieved by matching the drive direction anti-resonance frequency with the sense direction resonance frequency, as will be explained below. However, in contrast to the conventional gyroscopes, the flat region with significantly wider bandwidth can be easily overlapped with the resonance peak without feedback control with sufficient precision in spite of fabrication imperfections and variations in operation conditions as depicted graphically in FIG. 3b.

By utilizing dynamical amplification in the 2-DOF drive-oscillator instead of resonance, increased bandwidth and reduced sensitivity to structural and thermal parameter fluctuations and damping changes can be achieved, while sense-direction resonance provides high sensitivity of the device. Consequently, the design concept allows the building of z-axis gyroscopes utilizing surface-micromachining technology with large sense capacitances, while resulting in improved robustness and long-term stability over the operating time of the device. Thus, the approach of the invention is relaxes control requirements and tight fabrication and packaging tolerances.

Consider now the dynamics of the gyroscopic system 10. The dynamics of each rotary proof-mass 12, 14, 16 in the torsional gyroscope system 10 is best understood by attaching non-inertial coordinate frames to the center-of-mass of each proof-mass 12, 14, 16 and the substrate 28 as diagrammatically depicted in FIG. 4. The angular momentum equation for each mass 12, 14, 16 will be expressed in the coordinate frame associated with that mass 12, 14, 16 respectively. This allows the inertia matrix of each mass 12, 14, 16 to be expressed in a diagonal and time-invariant form. The absolute angular velocity of each mass 12, 14, 16 in the coordinate frame of that mass 12, 14, 16 will be obtained using the appropriate transformations. Thus, the dynamics of each mass reduces to $$I_s \dot{\vec{\omega}}_s^s + \vec{\omega}_s^s \times (I_s \vec{\omega}_s^s) = \vec{T}_{se} + \vec{T}_{sd}$$

$$I_p \dot{\vec{\omega}}_p^p + \vec{\omega}_p^p \times (I_p \vec{\omega}_p^p) = \vec{T}_{pe} + \vec{T}_{pd}$$

$$I_a \dot{\vec{\omega}}_a^a + \vec{\omega}_a^a \times (I_a \vec{\omega}_a^a) = \vec{T}_{ae} + \vec{T}_{ad} + M_d$$

where $I_s$, $I_p$, and $I_a$ denote the diagonal and time-invariant inertia matrices of the sensing plate 16, passive gimbal 14, and active gimbal 12, respectively, with respect to the associated body attached frames. Similarly, $\omega_s$, $\omega_p$, and $\omega_a$ denote the absolute angular velocity vectors of the sensing plate 16, passive gimbal 14, and active gimbal 12, respectively, expressed in the associated body frames. The external torques $T_{se}$, $T_{pe}$, $T_{ae}$ and $T_{sd}$, $T_{pd}$, $T_{ad}$ are the elastic and damping vector torques acting on the associated mass, whereas $M_d$ is the driving electrostatic vector torque applied to the active gimbal 12.

Figure 4:
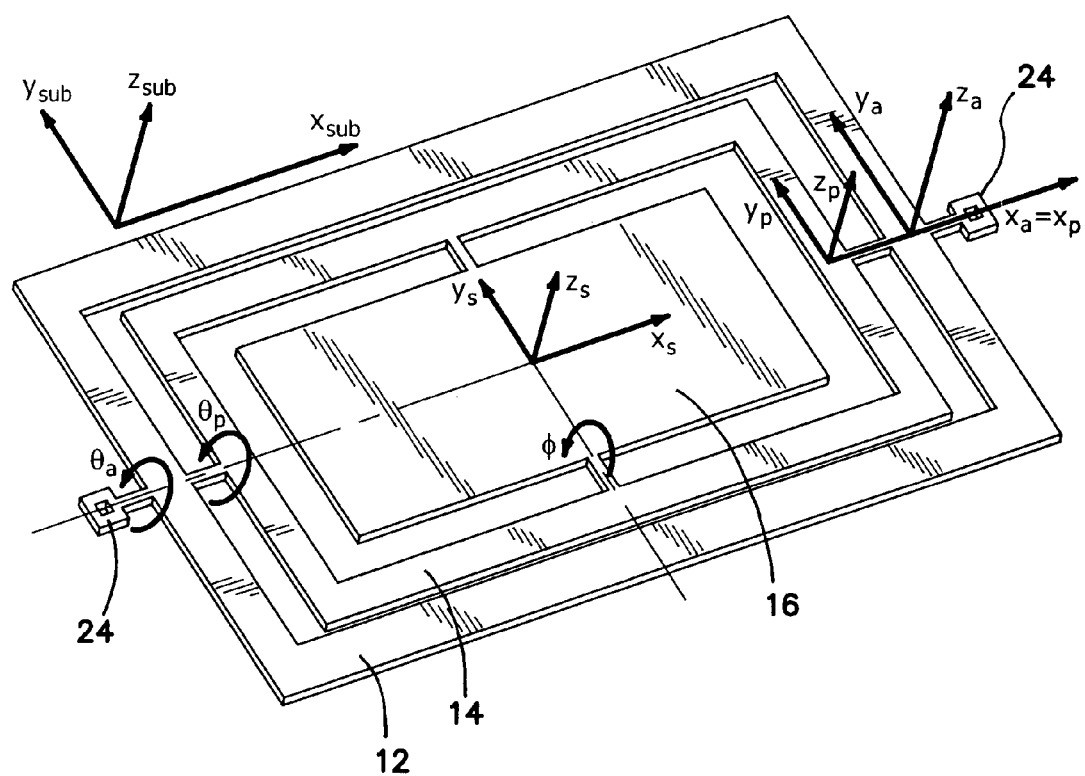
FIG. 4 is a diagram of the non-inertial coordinate frames attached to the sensing plate, passive gimbal, active gimbal, and the substrate.

If we denote the drive direction deflection angle of the active gimbal 12 by $\theta_a$, the drive direction deflection angle of the passive gimbal by $\theta_p$, the sense direction deflection angle of the sensing plate by $\phi$ (with respect to the substrate), and the absolute angular velocity of the substrate about the z-axis by $\Omega_z$ as shown in FIG. 4; the homogeneous rotation matrices from the substrate 28 to active gimbal 12($R_{sub \to a}$), from active gimbal 12 to passive gimbal 14 ($R_{a \to p}$), and from passive gimbal 14 to the sensing plate 16 ($R_{p \to s}$), respectively, become $$R_{sub \to a} = \begin{bmatrix} 1 & 0 & 0 \\ 0 & \cos\theta_a & -\sin\theta_a \\ 0 & \sin\theta_a & \cos\theta_a \end{bmatrix}$$

$$R_{a \to p} = \begin{bmatrix} 1 & 0 & 0 \\ 0 & \cos(\theta_p - \theta_a) & -\sin(\theta_p - \theta_a) \\ 0 & \sin(\theta_p - \theta_a) & \cos(\theta_p - \theta_a) \end{bmatrix}$$

$$R_{p \to s} = \begin{bmatrix} \cos\phi & 0 & \sin\phi \\ 0 & 1 & 0 \\ -\sin\phi & 0 & \cos\phi \end{bmatrix}$$

Using the obtained transformations, the total absolute angular velocity of the sensing plate can be expressed in the non-inertial sensing plate coordinate frame as $$\vec{\omega}_s^s = \begin{bmatrix} 0 \\ \dot{\phi} \\ 0 \end{bmatrix} + R_{p \to s} \begin{bmatrix} \dot{\theta}_p \\ 0 \\ 0 \end{bmatrix} + R_{p \to s} R_{a \to p} R_{sub \to a} \begin{bmatrix} 0 \\ 0 \\ \Omega_z \end{bmatrix}$$

The absolute angular velocities of the active gimbal 12 and passive gimbal 14 are obtained similarly, in the associated non-inertial body frame. Substitution of the angular velocity vectors into the derived angular momentum equations yields the dynamics of the sensing plate 16 about the sense axis (y-axis), and the active and passive gimbal dynamics about the drive axis (x-axis)

$$I_y^s \ddot{\phi} + D_y^s \dot{\phi} + [K_y^s + (\Omega_z^2 - \theta_p^2)(I_z^s - I_x^s)]\phi = (I_z^s + I_y^s - I_x^s)\theta_p \Omega_z + I_y^s \theta_p \dot{\Omega}_z + (I_z^s - I_x^s)\phi^2 \theta_p \Omega_z$$

$$(I_x^p + I_x^s)\ddot{\theta}_p + (D_x^p + D_x^s)\dot{\theta}_p + [K_x^p + (I_y^p - I_z^p + I_y^s - I_z^s)\Omega_z^2]\theta_p = K_x^p \theta_a - (I_z^s + I_x^s - I_y^s)\phi \Omega_z - I_x^s \dot{\phi} \Omega_z$$

$$I_x^a \ddot{\theta}_a + D_x^a \dot{\theta}_a + K_x^a \theta_a = K_x^p (\theta_p - \theta_a) + M_d$$

where $I_x^s$, $I_y^s$, and $I_z^s$ denote the moments of inertia of the sensing plate 16; $I_x^p$, $I_y^p$, and $I_z^p$ are the moments of inertia of the passive gimbal 14*l*; $I_x^a$, $I_y^a$, and $I_z^a$ are the moments of inertia of the active gimbal 12; $D_x^s$, $D_x^p$, and $D_x^a$ are the drive-direction damping ratios, and $D_y^s$ is the sense-direction damping ratio of the sensing plate 16; $K_y^s$ is the torsional stiffness of the suspension beam 26 connecting the sensing plate 16 to the passive gimbal 14, $K_x^p$ is the torsional stiffness of the suspension beam 30 connecting the passive gimbal 14 to the active gimbal 12, and $K_x^a$ is the torsional stiffness of the suspension beam 22 connecting the active gimbal 12 to the substrate 28.

With the assumptions that the angular rate input is constant, i.e. $\dot{\Omega}_z = 0$, and the oscillation angles are small, the rotational equations of motion can be further simplified, yielding:

$$I_y^s \ddot{\phi} + D_y^s \dot{\phi} + K_y^s \phi = (I_z^s + I_y^s - I_x^s)\theta_p \Omega_z$$

$$(I_x^p + I_x^s)\ddot{\theta}_p + (D_x^p + D_x^s)\dot{\theta}_p + K_x^p = K_x^p \theta_a$$

$$I_x^a \ddot{\theta}_a + D_x^a \dot{\theta}_a + K_x^a \theta_a = K_x^p (\theta_p - \theta_a) + M_d$$

It should be noticed in the sense-direction dynamics that, the term, $(I_z^a + I_y^s - I_x^s)\theta_p(t)\Omega_z$ is the Coriolis torque that excites the sensing plate about the sense axis, with $\phi$ being the detected deflection angle about the sense axis for angular rate measurement.

Consider now cross-axis sensitivity. The response of the sensing plate 16 to the angular input rates ($\Omega_x$ and $\Omega_y$) orthogonal to the sensitive axis (z-axis) can be modeled similarly, using the derived homogeneous transformation matrices, $R_{p \to s}$, $R_{a \to p}$, and $R_{sub \to a}$ and expressing the total absolute angular velocity of the sensing plate as $$\vec{\omega}_{s,xy}^s = \begin{bmatrix} 0 \\ \dot{\phi} \\ 0 \end{bmatrix} + R_{p \to s} \begin{bmatrix} \dot{\theta}_p \\ 0 \\ 0 \end{bmatrix} + R_{p \to s} R_{a \to p} R_{sub \to a} \begin{bmatrix} \Omega_x \\ \Omega_y \\ 0 \end{bmatrix}$$

$$\vec{\omega}_{s,xy}^s = \begin{bmatrix} 0 \\ \dot{\phi} \\ 0 \end{bmatrix} + R_{p \to s} \begin{bmatrix} \dot{\theta}_p \\ 0 \\ 0 \end{bmatrix} + R_{p \to s} R_{a \to p} R_{sub \to a} \begin{bmatrix} \Omega_x \\ \Omega_y \\ 0 \end{bmatrix}$$

With the derived total absolute angular velocity in the presence of cross-axis inputs $\omega_{s,xy}^s$, and the assumption that the input rates are constant ($\dot{\Omega}_x = \dot{\Omega}_y = 0$); the equation of motion of the sensing plate about the sense-axis becomes:

$$I_s \dot{\vec{\omega}}_{s,xy}^s + \vec{\omega}_{s,xy}^s \times (I_s \vec{\omega}_{s,xy}^s) = \vec{T}_{se} + \vec{T}_{sd}$$

$$I_y^s \ddot{\phi} + D_y^s \dot{\phi} + [K_y^s + (\theta_p^2 + 2\theta_p \Omega_x + \Omega_x^2)(I_x^s - I_z^s)]\phi = (I_x^s - I_z^s)(\theta_p \dot{\theta}_p \Omega_x + \theta_p \Omega_x \Omega_y)$$

For small oscillation angles and small magnitudes of the cross-axis inputs $\Omega_x$ and $\Omega_y$ the equation of motion reduces to:

$$I_y^s \ddot{\phi} + D_y^s \dot{\phi} + K_y^s \phi = (I_z^s - I_x^s)(2\phi \theta_p \Omega_x - \theta_p \Omega_x \Omega_y)$$

When the excitation terms on the right side of this equation are compared to the excitation component $(I_z^a + I_y^s - I_x^s)\theta_p(t)\Omega_z$ due to $\Omega_z$, it is seen that the additional factors $\phi$ and $\theta_p$ in these terms make them orders of magnitude (over $10^{-5}$ times) smaller than the Coriolis excitation. Thus, the cross-axis sensitivity of the ideal system is negligible, provided that the sensor is aligned perfectly within the sensor package.

It is assuring to refer now to a MEMS implementation of the design concept. First, the suspension system design for the torsional system is investigated with the derivation of the stiffness values. The capacitive sensing and actuation details is followed by the discussion of achieving dynamic amplification in the drive mode, along with an approach for determining optimal system parameters to maximize sensor performance. Finally, the sensitivity and robustness analyses of the system are presented.

Figure 5:
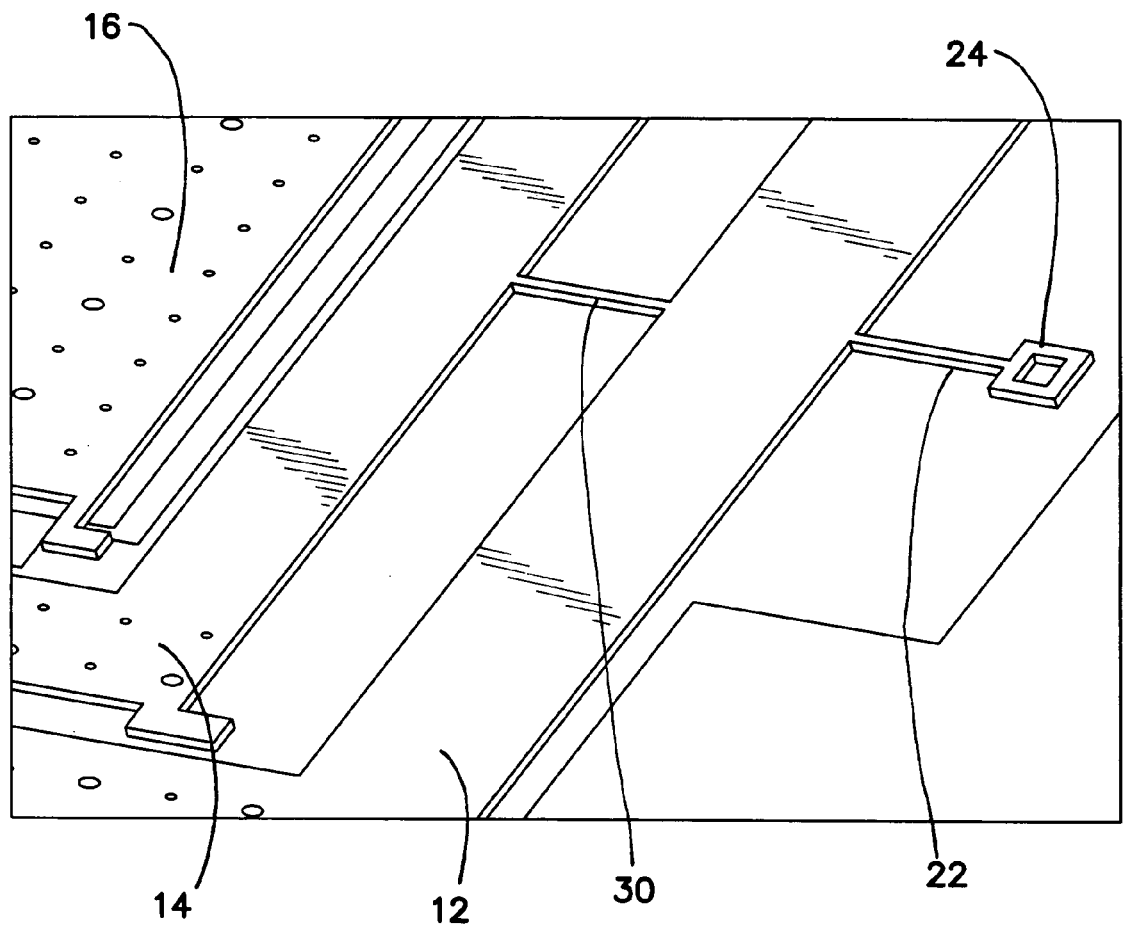
FIG. 5 is a SEM micrograph of the torsional suspension beams in the illustrated embodiment of the gyroscope.

The suspension system of the device that supports the gimbals 12, 14, and the sensing plate 16 is composed of thin polysilicon beams with rectangular cross-section functioning as torsional bars. The active gimbal 12 is supported by two torsional beams 22 of length $L_x^a$ anchored to the substrate 28, aligned with the drive axis x, so that the gimbal 12 oscillates only about the drive axis x. The passive gimbal 14 is also attached to the active gimbal 12 with two torsional beams 30 of length $L_x^p$ aligned with the drive axis x, forming the 2-DOF drive-direction oscillator. Finally, the sensing plate 16 is connected to the passive gimbal 14 using two torsional beams 26 of length $L_y^s$ lying along the sense axis y, allowing it to oscillate about the sense axis y independent from the gimbals 12, 14 as shown in the enlargement of FIG. 5.

Assuming each torsional beam 22, 26 and 30 is straight with a uniform cross-section, and the structural material is homogeneous and isotropic; the torsional stiffness of each beam 22, 26 and 30 with a length of L can be modeled as $$K = \frac{SG + \sigma J}{L}$$

where $G = E/[2(1-v)]$ is the shear modulus with the elastic modulus E and Poisson's ratio v; $\sigma$ is the residual stress; and $J = (wt^3 + tw^3)/12$ is the polar moment of inertia of the rectangular beam cross-section with a thickness of t and a width of w. The cross-sectional coefficient S can be expressed for the same rectangular cross-section as $$S = \left(\frac{t}{2}\right)^3 \frac{w}{2} \left[\frac{16}{3} - 3.36 \frac{t}{w}\left(1 - \frac{t^4}{12w^4}\right)\right]$$

Assuming the same thickness t and width w for each beam, the torsional stiffness values in the equations of motion of the ideal gyroscope dynamical system model can be calculated as follows:

$$K_x^a = 2 \frac{SG + \sigma J}{L_x^a}$$

$$K_x^p = 2 \frac{SG + \sigma J}{L_x^p}$$

$$K_y^s = 2 \frac{SG + \sigma J}{L_y^s}$$

For the illustrated embodiment shown in FIG. 2, the suspension beams 22, 26, 30 lengths are $L^a_x = L^p_x = L^s_y = 30$ μm, with the width of 2 μm and a structural thickness of 2 μm; resulting in the stiffness values of $K^a_x = K^p_x = K^s_y = 1.04 \times 10^{-18}$ kg m²/s².

Consider now a finite element analysis of the system 10. In order to verify the validity of the assumptions in the theoretical analysis, the operational modes and the other resonance modes of the system were simulated using Finite Element Analysis (FEA) package MSC Nastran/Patran.

The geometry of the system 10 was optimized to match the drive-mode resonant frequency of the isolated passive mass-spring system $\omega^p_x = \sqrt{K^p_x/(I^a_x + I^s_x)}$ with the sense mode resonance frequency of the sensing plate $\omega_x = \sqrt{K^s_y/I^s_y}$ as will be explained below. Theoretical analysis of the device geometry, which is presented in detail in FIG. 2, and a structural thickness of 2 μm yields $K^p_x = K^s_y = 1.04 \times 10^{-18}$ kg m²/s², $(I^a_x + I^s_x) = 4.97 \times 10^{-18}$ kg m²/s² and, $I^s_y = 4.94 \times 10^{-18}$ kg m²/s² resulting in $\omega^p_x = 7.285$ kHz and $\omega_y = 7.263$ kHz.

Figure 6:
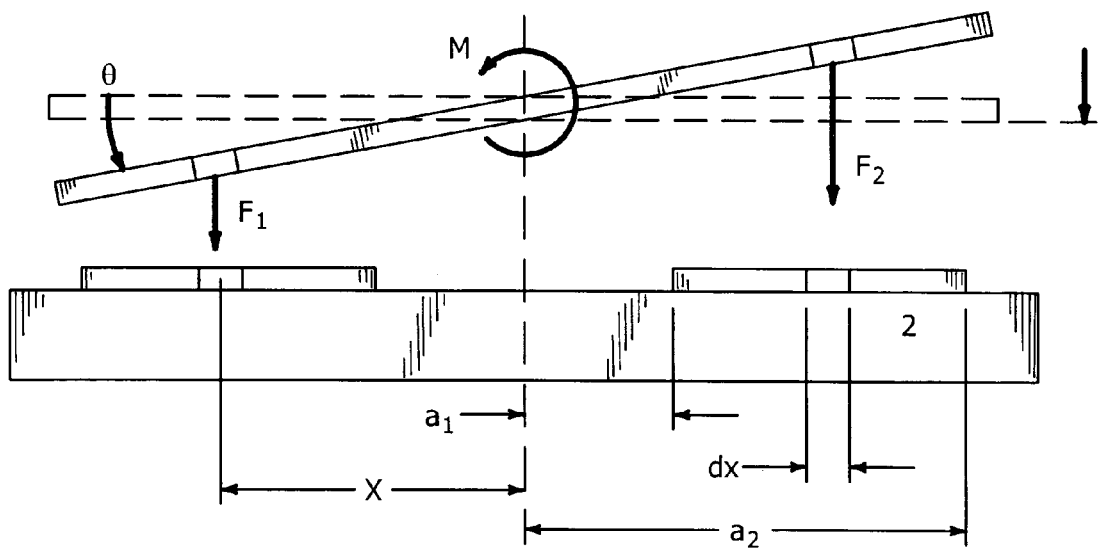
FIG. 6 is a cross-sectional depiction of the torsional electrostatic parallel-plate actuation electrodes functionally attached to the active gimbal.

Consider now the electrostatic actuation of the system 10. The active gimbal 12 is excited about the drive axis x by the electrodes 18 symmetrically placed underneath the edges of active gimbal 12. Applying a voltage of $V_1 = V_{DC} + V_{AC} \sin(\omega_d t)$ to electrode 32 on one side of the gimbal 12, and $V_2 = V_{DC} - V_{AC} \sin(\omega_d t)$ to electrode 34 on the opposing side as shown in the diagram of FIG. 6, a balanced actuation scheme is imposed.

The net moment $M_d$ that drives the active gimbal 12 is the sum the positive and negative resultant moments applied by electrode 32 and electrode 34, respectively. These moments can be expressed by integrating the moments generated by the infinite number of infinitesimally small capacitors of width dx, located by a distance of x from the center of rotation as diagrammed in FIG. 6. Neglecting the fringing field effects, with symmetric electrodes of width $(a_2 - a_1)$ and length L placed by a distance of a from the center-line, the net actuation moment $M_d$, which is a function of the deflection angle $\theta_a$, can be expressed as:

$$M_d = M_1 - M_2 = \int_{a1}^{a2} x dF_1 - \int_{a1}^{a2} x dF_2$$

$$= \int_{a1}^{a2} x \frac{\varepsilon_0 V_1^2 L dx}{2(h - x\tan\theta_a)^2} - \int_{a1}^{a2} x \frac{\varepsilon_0 V_2^2 L dx}{2(h + x\tan\theta_a)^2}$$

where h is the elevation of the structure from the substrate, and $\varepsilon_o = 8.85 \times 10^{-12}$ F/m is the permittivity of air. Assuming small angles of actuation, which are achieved due to dynamic amplification of oscillations as will be explained below, the net electrostatic moment reduces to the expression used in the simulations of the dynamic system:

$$M_d = \frac{\varepsilon_0 L}{2\theta_a^2} \left( \frac{1}{1 - \frac{a_2}{h}\theta_a} - \frac{1}{1 - \frac{a_1}{h}\theta_a} + \ln\frac{h - a_2\theta_a}{h - a_1\theta_a} \right) V_1^2 -$$

$$\frac{\varepsilon_0 L}{2\theta_a^2} \left( \frac{1}{1 + \frac{a_2}{h}\theta_a} - \frac{1}{1 + \frac{a_1}{h}\theta_a} + \ln\frac{h + a_2\theta_a}{h + a_1\theta_a} \right) V_2^2$$

For the illustrated embodiment in FIG. 2, the drive mode electrodes 18 underneath the active gimbal 12 are 380 μm×60 μm resulting in a total of 0.252 μN force per each electrode with a 1V actuation voltage. The total moment applied by each electrode 18 at the deflection of $\theta_a = 0$ is $5.29 \times 10^{-13}$ Nm.

Consider the optimization of system parameters. Since the foremost mechanical factor determining the performance of the gyroscope system 10 is the angular deflection φ of the sensing plate 16 about the sense axis y due to the input rotation, the parameters of the dynamical system should be optimized to maximize φ. However, the optimal compromise between amplitude of the response and bandwidth should be obtained to maintain robustness against parameters variations, while the response amplitude is sufficient for required sensitivity. The trade-offs between gain of the response (for higher sensitivity) and the system bandwidth (for increased robustness) will be typically guided by application requirements.

For a given input rotation rate $\Omega_z$, in order to maximize the Coriolis torque $(I^a_z + I^s_y - I^s_x)\theta_p(t)\Omega_z$ that excites the sensing plate 16 about the sense axis y, the oscillation amplitude of the passive gimbal 14 about the drive axis x should be maximized. In the drive mode, the gyroscope 10 is simply a 2-DOF torsional system. The sinusoidal electrostatic drive moment $M_d$ is applied to the active gimbal 12. The combination of the passive gimbal 14 and the sensing plate 16 comprise the vibration absorber of the 2-DOF oscillator, which mechanically amplifies the oscillations of the active gimbal 12. Approximating the 2-DOF oscillator by a lumped mass-spring-damper model, the equations of motion about the drive axis x can be expressed as:

$$I^a_x \ddot{\theta}_a + D^a_x \dot{\theta}_a + K^a_x \theta_a = K^p_x(\theta_p - \theta_a) + M_d$$

$$(I^p_x + I^s_x)\ddot{\theta}_p + (D^p_x + D^s_x)\dot{\theta}_p + K^p_x \theta_p = K^p_x \theta_a$$

where $I^s_x$, $I^s_y$, and $I^s_z$, are the moments of inertia of the sensing plate 16; $I^p_x$, $I^p_y$, and $I^p_z$, are the moments of inertia of the passive gimbal 14; $I^a_x$, $I^a_y$, and $I^a_z$, are the moments of inertia of the active gimbal 12; $D^s_x$, $D^p_x$, and $D^a_x$ are the drive-direction damping ratios; $K^p_x$ is the torsional stiffness of the suspension beam 30 connecting the passive gimbal 14 to the active gimbal 12, and $K^a_x$ is the torsional stiffness of the suspension beam 22 connecting the active gimbal 12 to the substrate 28.

When the driving frequency $\omega_{drive}$ is matched with the resonant frequency of the isolated passive mass-spring system $\omega^p_x$ i.e.

$$\omega_{drive} = \omega^p_x = \sqrt{\frac{K^p_x}{(I^a_x + I^s_x)}}$$

passive gimbal 14 and the sensing plate 16 move to exactly cancel out the driving moment $M_d$ applied to the active gimbal 12, and maximum dynamic amplification is achieved at this anti-resonance frequency. Thus, if the drive direction anti-resonance frequency $\omega^p_x$ and the sense direction resonance frequency $$\omega_y = \sqrt{\frac{K^p_y}{(I^s_y)}}$$

are designed to match, maximum dynamic amplification in drive mode is achieved, the Coriolis torque drives the sensing plate 16 into resonance, and the drive-mode oscillator is excited in the flat frequency band. The optimal design condition can be summarized as follows:

$$\sqrt{\frac{K_x^p}{(I_x^a + I_x^s)}} = \sqrt{\frac{K_y^p}{I_y^s}} = \omega_{drive}$$

In contrast to the conventional gyroscopes, where two sharp resonance peaks with very narrow bandwidth have to be matched with a very precise and constant ratio, this design condition can easily be met without feedback control with sufficient precision in spite of fabrication imperfections and operation condition variations, thanks to the flat region in the drive-mode frequency response with significantly wider bandwidth.

Turn now to the analysis of sensitivity and robustness. The response of the complete electromechanical system of the torsional gyroscope 10 was simulated by incorporating the presented electromechanical modeling. With the sense-direction resonance frequency of 7.457 kHz as obtained from the finite element analysis simulations, the effective sense direction response amplitude of the sensing capacitors 20 to a 1°/sec input angular rate was found to be $1.6 \times 10^{-5}$ μm. It is assumed that the gyroscope 10 is vacuum packaged so that the pressure within the encapsulated cavity is equal to 100 miliTorrs (13.3 Pa), and that the passive gimbal 14 oscillates in the whole 2 μm gap. The response of a torsional gyroscope with a resonant drive-mode and the same geometry to the same input is $0.53 \times 10^{-5}$ μm, since the stable drive-mode actuation range is limited to $0.66 \times 10^{-5}$ μm. However, the required actuation voltage amplitude for the anti-resonant mode is 3.9 times larger than the resonant drive-mode approach. It should also be noticed that, in the illustrated embodiment of FIG. 2 with the sensing electrode 20 area of 200 μm×130 μm (nominal capacitance of 11.51 pF); 1°/sec input angular rate results in a total capacitance change of 29.2 fF, which is considerably larger compared to in-plane surface-micromachined gyroscope designs.

Figure 7:
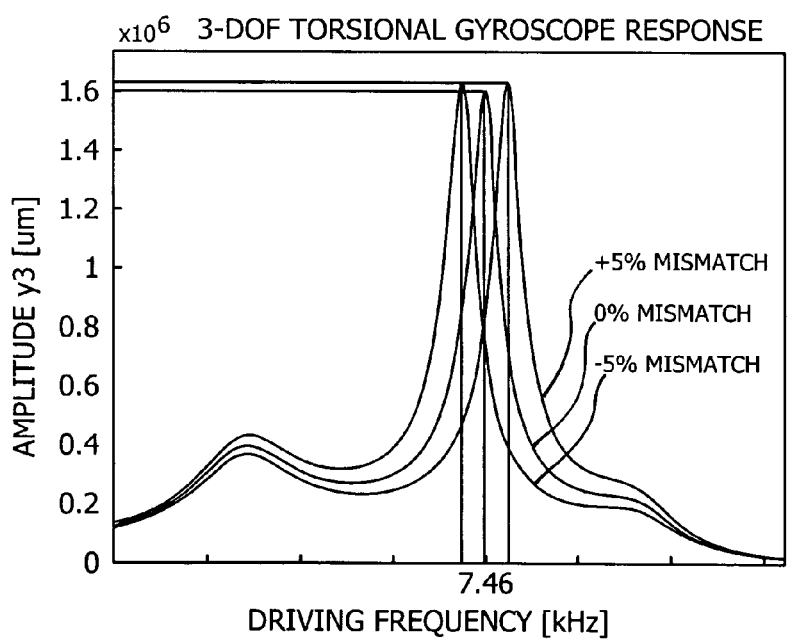
FIG. 7 is a graph of the amplitude response in µm as a function of driving frequency of the complete torsional gyroscope system. A 5% mismatch between the sense-mode resonance frequency ($\omega_y$) and the drive-mode anti-resonance frequency ($\omega^P_x$) results in only 2.5% error in the response amplitude.

In the case of a potential shift in the sense-mode resonance frequency, e.g. due to temperature fluctuations, residual stresses, or fabrication variations, the response amplitude is sustained at a constant value to a great extent without active tuning of resonance frequencies. For example, a 5% mismatch in the sense-mode resonance frequency of the sensing plate 16 ($\omega_y$) and the drive-mode anti-resonance frequency ($\omega_x^p$) results in only 2.5% error in the response amplitude as depicted in the graph of FIG. 7. Without active compensation, a conventional 2-DOF gyroscope can exhibit over 60% error for the same frequency mismatch under the same operation conditions. Thus, the increased bandwidth of the 2-DOF drive-oscillator achieved by utilizing dynamical amplification provides improved robustness against structural and thermal parameter fluctuations.

The response of the fabricated gyroscopes 10 have been characterized electrostatically under vacuum, and optically using a Sensofar PLμ Confocal Imaging Profiler and Polytec Scanning Laser Doppler Vibrometer under atmospheric pressure. The sense-mode resonance frequency and the drive-mode antiresonance frequency of the gyroscope 10 were measured in a cryogenic MMR Vacuum Probe Station. The frequency response of the system 10 was acquired using off-chip transimpedance amplifiers connected to an HP Signal Analyzer in sine-sweep mode. Due to the large actuation and sensing capacitances, actuation voltages as low as 0.7V to 1.8V DC bias, and 30 m VAC were used under 40 mTorr vacuum. For sense-mode resonance frequency detection, one-sided actuation was utilized, where one sensing electrode 20 was used for driving, and the other for detection. For detecting the drive-mode antiresonant frequency, which is equal to the resonant frequency of the isolated passive mass-spring system ($\omega_x^p$), a separate test structure that consists of the passive gimbal 14—sensing plate 16 assembly was used, with the one-sided actuation scheme, and the same actuation voltages.

In order to verify the mode-shapes of the structure at the measured frequencies, a Polytec Scanning Laser Doppler Vibrometer was used under atmospheric pressure for dynamic optical profiling. Laser Doppler vibrometry (LDV) is a non-contact vibration measurement technique using the Doppler effect, based on the principle of the detection of the Doppler shift of coherent laser light, that is scattered from a small area of the test object. Laser vibrometers are typically two-beam interferometric devices which detect the phase difference between an internal reference and the measurement beam, which is focused on the target and scattered back to the interferometer.

Figure 8A:
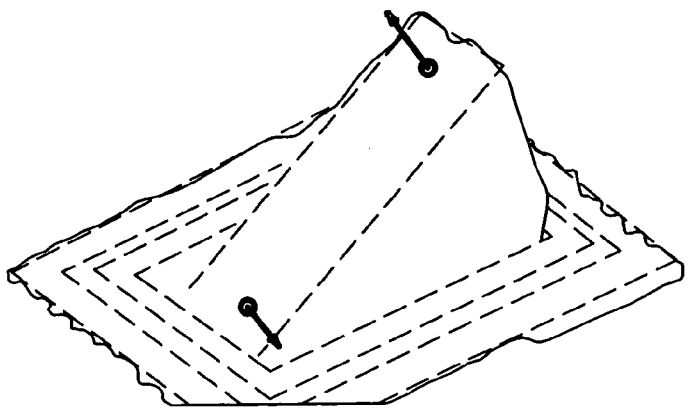
FIG. 8a is a scan of the sense-mode dynamic response measurements using Laser Doppler vibrometry (LDV) in the scanning mode.
Figure 8B:
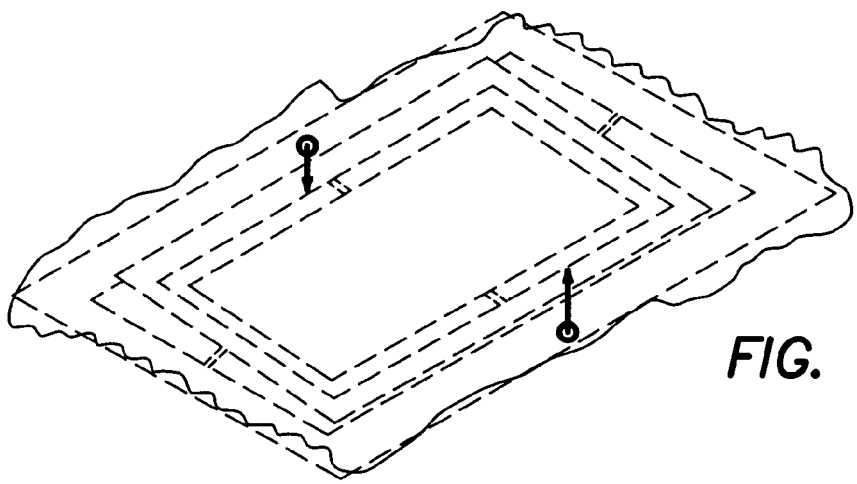
FIG. 8b is a scan of the drive-mode dynamic response measurements using the LDV in the scanning mode.

Dynamic response of the system 10 in the drive and sense modes was characterized using the Scanning Laser Doppler Vibrometer in scanning mode, which allows to measure the response of a dense array of points on the whole gyroscope structure. Dynamic excitation of the sensing plate 16 about the sense-axis y at the experimentally measured sense-mode resonance frequency ($\omega_y$=8.725 kHz) revealed that only the sensing plate 16 responds in the sense mode, verifying that the 1-DOF resonator formed in the sense-mode is decoupled from the drive-mode as depicted in the scan of FIG. 8a, in agreement with the intended design and finite element analysis simulations. Dynamic excitation of the active gimbal 12 about the drive-axis at frequencies away from the anti-resonance frequencies verified that the active gimbal 12 oscillates independent from the passive gimbal-sensing plate assembly as shown in the scan of FIG. 8b, constituting the active mass of the 2-DOF oscillator.

Figure 9:
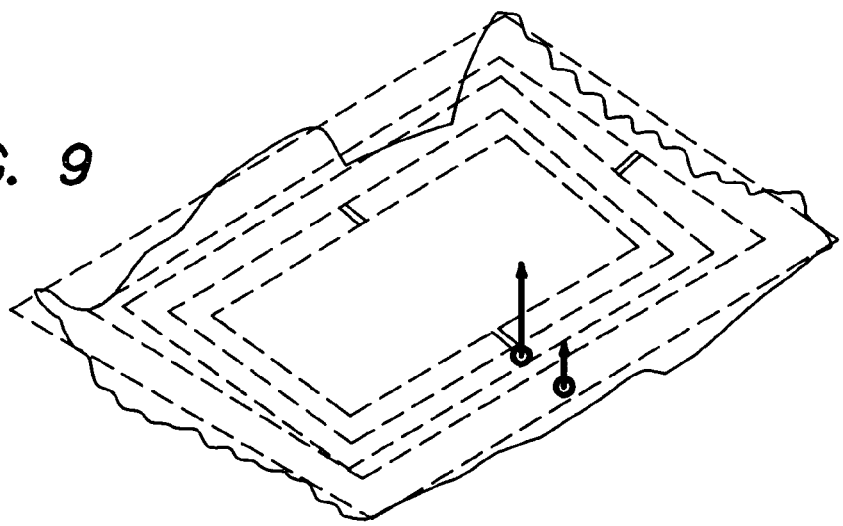
FIG. 9 is an image of scanning mode LDV measurement at the anti-resonance frequency, demonstrating dynamic amplification of the active gimbal oscillations by the passive gimbal. The passive gimbal was observed to achieve over 1.7 times larger oscillation amplitudes than the driven active gimbal.

Most prominently, dynamic amplification of the active gimbal 12 oscillations by the passive gimbal 14 was successfully demonstrated. At the drive-mode anti-resonance frequency, which was measured to be 8.687 kHz, the passive gimbal 14 was observed to achieve over 1.7 times larger oscillation amplitudes than the driven active gimbal 12 as shown in FIG. 9. This translates into attaining over 2.4 times larger drive-mode deflection angles at the sensing plate 16 than the active gimbal 12.

In conclusion, the design concept of a gimbal-type torsional micromachined gyroscope 10 with non-resonant drive mode has thus been described. The analysis of the system dynamics and structural mechanics of the torsional system 10 are presented above, along with the preliminary experimental results verifying the design objectives. The claimed approach is based on forming a torsional 2-DOF drive-mode oscillator with the use of one active gimbal 12 and one passive gimbal 14, to achieve large oscillation amplitudes in the passive gimbal 14 by amplifying the small oscillation amplitude of the driven gimbal 12. This allows minimization of the nonlinear force profile and minimization of instability due to parallel-plate actuation of the active gimbal 12, while eliminating the mode-matching requirement by obtaining a flat operation frequency band in the drive-mode. With the basic operational principles experimentally verified, the design concept overcomes the small actuation and sensing capacitance limitation of conventional surface-micromachined gyroscopes, while achieving improved excitation stability and robustness against fabrication imperfections and fluctuations in operation conditions. Thus, the claimed approach leads to reduced cost and reduced complexity in fabrication and packaging of MEMS-based multi-axis inertial sensors.

The claimed torsional z-axis surface-micromachined gyroscope 10 with non-resonant actuation differs from all conventional micromachined gyroscopes:

(1) in allowing the use of out-of-plane actuation and out-of-plane sensing electrodes in a z-axis micromachined gyroscope. Thus, very large actuation and detection areas are possible in surface micromachined devices, unlike any in-plane operating z-axis micromachined gyroscopes.

(2) in utilizing dynamic amplification of torsional oscillations in the drive-mode by employing a 2 degrees-of-freedom (DOF) drive-direction oscillator. Utilizing dynamic amplification instead of resonance allows to achieve large drive-mode oscillation amplitudes of the sensing element with small actuation amplitudes, and thus, provides improved linearity and stability despite parallel-plate actuation.

(3) in providing over 15 times increased bandwidth in the drive mode; which relaxes the mode-matching requirement and reduces sensitivity to structural and thermal parameter fluctuations and damping changes.

(4) in providing a flat operation region between two resonance peaks in the frequency response curves of the 2-DOF drive-mode oscillator. This ensures the drive-mode oscillation amplitude is insensitive to parameter fluctuations in the operation frequency band. Thus the device has improved robustness to fluctuations in residual stresses, variations in elastic modulus from run to run, and also thermal fluctuations throughout the operation time.

(5) in operating at resonance in the sense direction for improved sensitivity, while the drive direction amplitude is inherently constant within the same frequency band.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A MEMS-based inertial torsional z-axis surface-micromachined gyroscope with only 3-DOF and with non-resonant actuation to measure the angular rotation of an object comprising:
   a substrate;
   a torsional 2-DOF drive-mode oscillator coupled to the substrate and comprised of one driven active gimbal and one passive gimbal to achieve large oscillation amplitudes by amplifying the small oscillation amplitude of the driven active gimbal, so that minimization of the nonlinear force profile and minimization of instability due to actuation of the driven active gimbal are achieved, while substantially eliminating any mode-matching requirement by obtaining a flat operational frequency band in the drive-mode, the 2-DOF drive-mode oscillator having at least two resonant drive peaks with a flattened frequency response therebetween; and
   a sensing plate coupled to the torsional 2-DOF drive-mode oscillator which sensing plate oscillates with a third DOF with a sense resonance at a frequency in the flattened frequency between the two resonant peaks of the 2-DOF drive oscillator.

2. The gyroscope of claim 1 further comprising actuation and sensing electrodes and
   where the active gimbal, passive gimbal and sensing plate lie in a common plane when at rest
   where the actuation and sensing electrodes comprise out-of-plane actuation electrodes and out-of-plane sensing electrodes.

3. A MEMS gyroscope comprising:
   a substrate;
   a pair of anchors lying along a drive axis, spaced from each other and connected to the substrate;
   a pair of first torsional beams lying along the drive axis, each first torsional beam coupled to one of the anchors;

an active gimbal coupled to the pair of first torsional beams and suspended above the substrate by the anchors and the first torsional beams;

a drive electrode disposed on the substrate proximate to the active gimbal to selectively drive the active gimbal into torsional oscillation;

a pair of second torsional beams lying along the drive axis, each second torsional beam coupled to the active gimbal;

a passive gimbal coupled to the pair of second torsional beams and suspended above the substrate by the second torsional beams;

a pair of third torsional beams lying along a sense axis, each third torsional beam coupled to the passive gimbal;

a sensing plate coupled to the pair of third torsional beams and suspended above the substrate by the third torsional beams; and a sensing electrode disposed on the substrate proximate to the sensing plate to sense torsional oscillation of the sensing plate;

where the active and passive gimbals, and the first and second pair of torsional beams are arranged and configured to comprise a 2-DOF drive oscillator having at least two resonant drive peaks with a flattened frequency response therebetween and where the sensing plate and third pair of torsional beams are arranged and configured to comprise a 1-DOF sensor with a sense resonance at a frequency in the flattened frequency between the two resonant peaks of the 2-DOF drive oscillator to provide a MEMS gyroscope which has only 3-DOF.

4. A method of operating a 3-DOF MEMS-based inertial torsional z-axis surface-micromachined gyroscope with nonresonant actuation to measure the angular rotation of an object comprising:

driving a torsional 2-DOF drive-mode oscillator at nonresonance comprised of an active gimbal and passive gimbal in a flat operational frequency band to amplify small oscillation amplitudes of a driven active gimbal, to minimize the nonlinear force profile and minimize instability due to actuation of the active gimbal, while substantially eliminating any mode-matching requirement; and sensing torsional oscillation in a third DOF at a resonance of a sensing plate coupled to the torsional 2-DOF drive-mode oscillator, where the resonance is within the flat operational frequency band of the 2-DOF drive oscillator.

5. The method of claim 4 where driving the torsional 2-DOF drive-mode oscillator at nonresonance comprises driving the torsional 2-DOF drive-mode oscillator with out-of-plane actuation electrodes and where sensing torsional oscillation at resonance comprises sensing with out-of-plane sensing.

6. The method of claim 4 where driving the torsional 2-DOF drive-mode oscillator at nonresonance comprises driving the 2 DOF drive-mode oscillator by parallel-plate actuation and dynamically amplifying torsional oscillations in the drive-mode instead of using matched resonance to achieve large drive-mode oscillation amplitudes of the sensing electrodes with small actuation amplitudes of the drive electrodes thereby providing linearity and stability despite parallel-plate actuation of the 2 DOF drive-direction oscillator.

* * * * *